United States Patent [19]

Stapp et al.

[11] Patent Number: 4,490,263

[45] Date of Patent: Dec. 25, 1984

[54] N,N-DISUBSTITUTED AMIDE COSURFACTANTS IN ENHANCED OIL RECOVERY PROCESSES

[75] Inventors: Paul R. Stapp; Mary B. Chaney, both of Bartlesville, Okla.

[73] Assignee: Phillips Petroleum Company, Bartlesville, Okla.

[21] Appl. No.: 448,665

[22] Filed: Dec. 10, 1982

[51] Int. Cl.³ .............................................. C09K 3/00
[52] U.S. Cl. ................................. 252/8.55 D; 252/352; 252/355; 252/357; 166/273; 166/274; 166/275
[58] Field of Search .................... 252/8.55 D, 8.55 R, 252/352, 355, 357; 166/273, 274, 275

[56] References Cited

U.S. PATENT DOCUMENTS 3,238,141  3/1966  Gatza .................................... 252/316
4,042,030  8/1977  Savins ................................... 166/273

Primary Examiner—Josephine Barr

[57] ABSTRACT

A surfactant system useful for oil recovery consisting essentially of a NaCl brine, a hydrocarbon sulfonate surfactant, such as a petroleum sulfonate, and a cosurfactant such as a N,N-disubstituted amide. In another embodiment, a $C_1$ to $C_8$ alcohol is additionally present as a cosurfactant.

18 Claims, 2 Drawing Figures

N,N-DISUBSTITUTED AMIDE COSURFACTANTS IN ENHANCED OIL RECOVERY PROCESSES

This invention relates to surfactant systems. More specifically, this invention relates to the use of new surfactant systems for oil recovery.

Waterflooding and surfactantflooding are processes well known in the art to recover vast quantities of oil which remain in the formation after primary oil recovery. In the case of surfactantflooding, it is not uncommon to employ a cosurfactant in conjunction with a surfactant wherein the former aids in forming microemulsions with the oil to be recovered.

Alcohols are commonly used as cosurfactants in surfactant flooding processes. The use of alcohols has sometimes required a relatively large volume of surfactant slug to be employed and this can sometimes dictate against the economics of the process. Therefore, it is highly desirable to develop surfactant systems which are economical by reducing the pore volumes of surfactant slug employed and yet are still efficient.

In addition, the effectiveness and economic attractiveness of surfactant systems in oil recovery is enhanced by increased viscosity of the surfactant system. Increased viscosity helps to increase the sweep efficiency of the surfactantflood. Therefore, it is also highly desirable to develop thickened surfactant/cosurfactant systems exhibiting high viscosities.

It is therefore an object of this invention to provide a surfactant system comprising a surfactant and cosurfactant which is effective for tertiary oil recovery yet requires fewer pore volumes of the surfactant system. A further object of this invention is to provide a thickened surfactant system comprising a surfactant and cosurfactant which exhibits a high viscosity. Still, a further object of this invention is to provide surfactantflooding processes which enhance tertiary oil recovery.

These and other objects, advantages, details, features and embodiments of this invention will become apparent to those skilled in the art from the following detailed description of the invention and the appended claims.

In accordance with one embodiment of this invention, I have discovered that the use of N,N-dialkylamides as cosurfactants in surfactantflooding operations for oil recovery results in effective oil recovery while at the same time reducing the total volume of surfactant needed to be effective for oil recovery.

In accordance with a second embodiment of this invention, I have discovered a new surfactant system consisting essentially of salt water, a hydrocarbon sulfonate surfactant and an N,N-dialkylamide and a $C_1$ to $C_8$ alcohol as cosurfactant to enhance the viscosity of the surfactant system.

Figure 1:
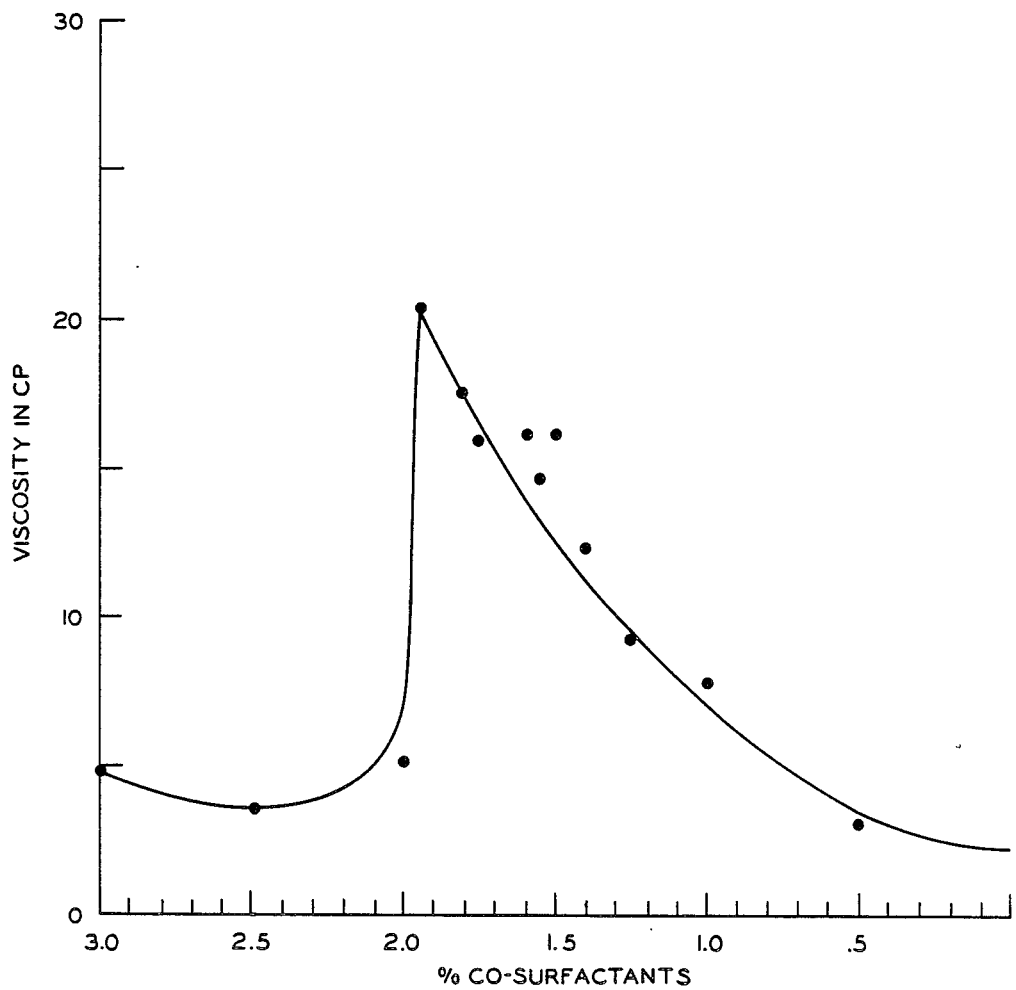
FIGS. 1 and 2 are graphs illustrating the relationship between viscosity and relative amide and alcohol weight relationships for surfactant systems in which the alcohol component is isobutyl alcohol. The viscosity measurements were taken at a salinity of 2.6 weight percent NaCl in FIG. 1 and 2.2 weight percent NaCl in FIG. 2.
Figure 2:
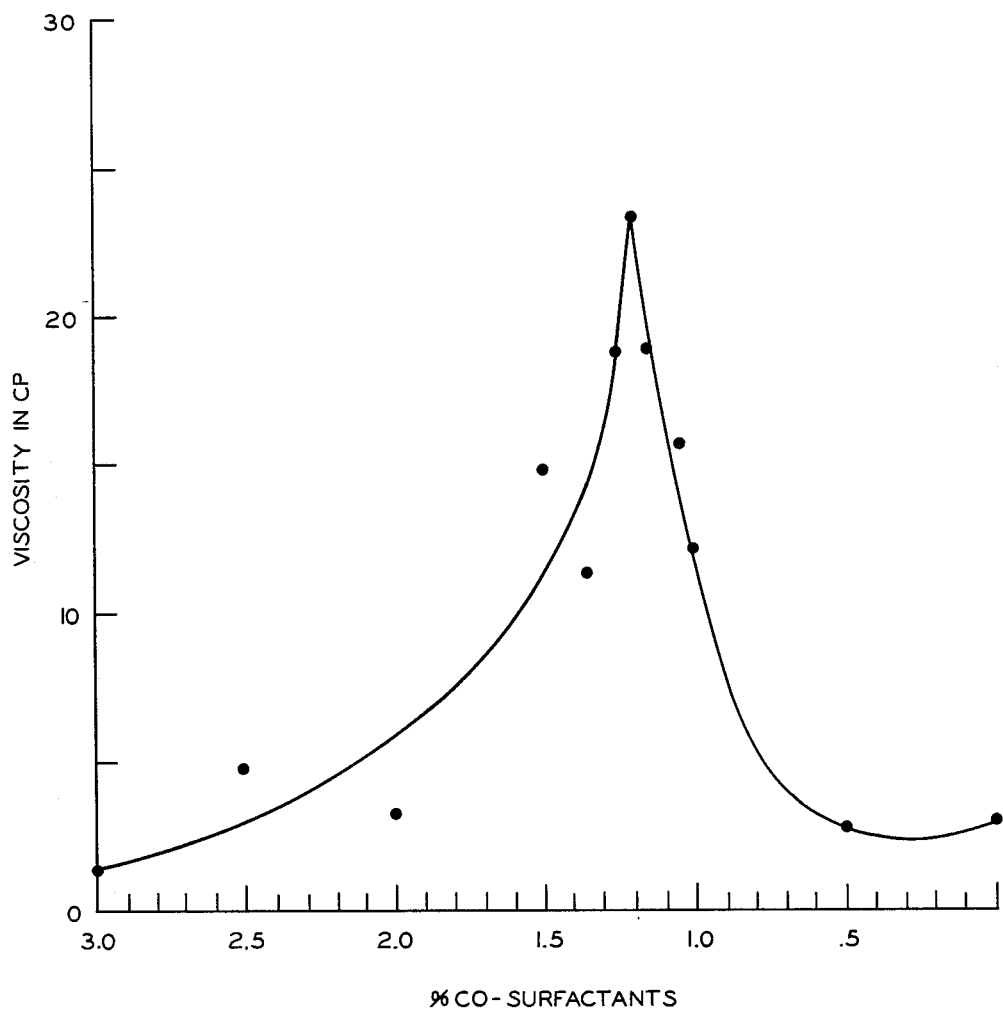

In both FIG. 1 and FIG. 2, the left hand side of the horizontal axis represents 3.0% DMF/0.0% IBA and the right hand side represents 0.0% DMF/3.0% IBA.

SURFACTANT SYSTEM

The preferred surfactant system of this invention is an aqueous saline surfactant system, optionally containing a protective agent. Generally, water is used containing a certain quantity of sodium chloride for practical reasons. Typical and preferred compositions of a surfactant system of this invention are shown in the following table:

TABLE I

| Ingredient | Broad Range | Preferred Range |
|---|---|---|
| Water (parts by wt.) | 100 | 100 |
| Hydrocarbon Sulfonate* (active parts by wt.) | 0.1–15 | 1–12 |
| Amide (parts by wt.) | 0.05–15 | 1–7 |
| Alcohol (parts by wt.) | 0.05–15 | 0.05–5 |
| Protective Agent (parts by wt.) | 0.01–3 | 0.05–2 |
| NaCl (parts by wt.) | 0–10 | 0.1–8 |

*The ranges for the active hydrocarbon sulfonate (e.g. petroleum sulfonate) in parts by weight. The "active" value is readily determined by multiplying parts by weight used and the fraction of active ingredients in the product.

SURFACTANT

The surfactant used in the surfactant system of this invention can broadly be a hydrocarbon sulfonate surfactant having an equivalent weight of from 225 to 600. Examples of hydrocarbon sulfonates include petroleum sulfonates, olefin sulfonates and alkyl sulfonates.

The preferred surfactant is a petroleum sulfonate. The petroleum sulfonates are commercially available products. The presently preferred surfactants used in oil recovery are petroleum sulfonates having an average equivalent weight in the range of 325 to 600. Best results with presently known reservoirs are believed to be obtainable with petroleum sulfonates having average equivalent weights of about 325 to 500.

COSURFACTANTS

In accordance with this invention, N,N-disubstituted amides are used as cosurfactants. These N,N-disubstituted amides can be represented by the following structural formula:

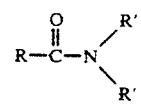

wherein R is either hydrogen, or a $C_1$ to $C_5$ alkyl group, R' is either a methyl, ethyl, or propyl group, with the proviso that the amide has a maximum of 10 carbon atoms.

Representative examples of amides of the type suitable for use in the present invention include N,N-dimethylformamide; N,N-dimethylacetamide; N,N-diethylpropionamide; N,N-dipropylformamide; N-methyl-N-ethylacetamide; N,N-dimethylcaproamide; N,N-diethylbutyramide; N,N-dipropylbutyramide; N,N-dimethylvaleramide; N,N-diethylvaleramide, and mixtures thereof.

N,N-Dimethylformamide (DMF) is the preferred amide for use in the present invention because of its commercial availability and its demonstrated effectiveness as a cosurfactant as shown in the examples.

Whatever amide is used must, however, exhibit some solubility, miscibility or dispersibility in brine. Generally, the amide should have a brine solubility of at least 0.1 and preferably, greater than one weight percent.

In the second embodiment of the present invention, $C_1$ to $C_8$ alcohols are present as cosurfactants along with the above compounds.

Representative examples of alcohols suitable for use in the present invention include isobutyl alcohol, isopropyl alcohol, t-butyl alcohol, isoamyl alcohol, octyl alcohols, hexyl alcohols and the like and mixtures thereof.

Isobutyl alcohol is the currently preferred alcohol for use as a cosurfactant in admixture with the N,N-disubstituted amide cosurfactant. Generally, the alcohol should have a water solubility of 0.01 to 20, preferably 0.1–5 grams per 100 grams of brine.

OIL RECOVERY PROCESS

An oil recovery process using the surfactant system of this invention as defined above constitutes another embodiment of this invention. This process involves generally the conventional steps of post primary oil recovery and distinguishes over the known procedures primarily in the use of N,N-disubstituted amides alone or in admixture with alkanols defined as cosurfactants.

PREFLUSH

It is optional to carry out a preflush step preceding the post-primary oil recovery operation. Such preflush operations are known in the art. Generally, a brine compatible with the surfactant system is injected via at least one injection well into the subterranean formation. Such a brine typically contains 2000–50,000 ppm salts, predominantly sodium chloride. Preferably a brine solution as utilized in the production of the surfactant system is also used in this preflush step.

The quantity of the preflush employed will generally be in a range of about 0.01 to 2, preferably 0.25 to 1 pore volume, based on the total pore volume of the formation or reservoir subjected to the recovery.

SURFACTANTFLOODING

After the optional preflush step, the surfactant fluid of this invention is injected into the reservoir via at least one injection well. The surfactant system is injected in an amount usually in the range of about 0.001 to 1.0, preferably 0.01 to 0.25 pore volume based on the pore volume of the total treated and produced formation.

The preferred operation makes use of the aqueous saline surfactant system in the form of a single phase. Usually the surfactant system contains brine, surfactant and the amide compound cosurfactant as the principal ingredients. Alternatively, amine-alcohol mixtures function as cosurfactant. The single phase surfactant system is introduced into the formation via one or more injection wells and the generation of a microemulsion takes place in-situ as the injected surfactant system contacts the oil in place. It is contemplated that surfactant systems characterized by the presence of more than one phase are preferably subjected to continuous mixing during the injection operation.

The present invention can be utilized for a variety of subterranean reservoirs. The invention is, however, particularly preferred in reservoirs containing hard brine connate water. Such hard brines are characterized by a high content of $Mg^{++}$ and $Ca^{++}$ ions in the reservoir water. Typical hard brines contain more than 100 ppm of $Ca^{++}$ and/or $Mg^{++}$.

Protective agents are an especially preferred ingredient in the surfactant system of this invention when used for oil recovery from reservoirs with hard brines. They aid in solubilizing the surfactant in a high salinity environment. Examples of such protecting agents are polyethoxylated fatty alcohols and polyethoxylated alkylphenols. In addition, the sodium salts of sulfated polyethoxylated fatty alcohols and polyethoxylated alkylphenols are known in the art to function as protective agents.

MOBILITY BUFFER

Following the surfactant slug it is presently preferred, although again not necessary, to inject a mobility buffer solution into the reservoir. This buffer helps prevent fingering and enhances the efficiency of the oil recovery. Mobility buffer solutions are aqueous solutions of thickening agents. Examples of useful mobility buffers are aqueous and nonaqueous fluids containing mobility reducing agents such as high molecular weight partially hydrolyzed polyacrylamides, biopolysaccharides, cellulose ethers and the like. The mobility buffer contains 50 to 20,000, preferably 200 to 5,000, ppm of the mobility reducing agent in the fluid.

The injection of the mobility buffer fluid can be at a constant composition or the mobility buffer can be graded, i.e., the injection starts out at a relatively high concentration of mobility reducing agent at the leading edge and the concentration of said agent tapers off toward the trailing edge. As an example, the mobility buffer can start with a concentration of 2500 ppm of polyacrylamide in the water and end with 250 ppm of polyacrylamide in water. These mobility buffer fluids are well known in the art.

The invention will be still more fully understood from the following detailed examples which are intended for illustrative purposes only and not for an undue limitation of the scope of this invention.

The following conditioning procedure was used in preparing the waterwet Berea sandstone cores for surfactantflooding.

Berea sandstone cores measuring approximately 3 feet in length and 3 inches in diameter were dried under vacuum for 24 hours at 250 F. Polycarbonate disc end plates with centrally located ⅛" threaded openings were secured to each end of the core with epoxy adhesive before applying an epoxy coating to the outside surface of the core. The epoxy coating material was formulated by mixing 550 g of a commercially available epoxy resin, 50 g of a suitable activator and 140 g diatomaceous earth. This mixture was stirred until smooth before applying to the surface of the core. The cores were rotated continuously as the epoxy mixture was applied with a 2" paint brush. Four gauze strips measuring 2"×12" were applied to the core in the following manner: a first gauze strip was applied to the core and covered with epoxy as the core was rotated; the remaining three strips were then individually incorporated in a similar manner. The core coating was cured over a period of about 4 hours at ambient temperature as the core was rotated. One-eighth inch male connector fittings were placed on each end of the core and pipe plug caps were put on the core.

The core was weighed to determine the dry weight before being saturated with brine of the desired concentration. A vacuum of about 1 mm was pulled on the core before saturating the core with approximately 1000 mL of brine. After saturation, approximately 100 to 200 mL of brine were pumped through the core before determining the original permeability to water. A 1 mL portion of effluent brine was collected from the saturated core and thereafter during a period of one minute, the volume of additional effluent collected and the pressures in psi were recorded. With these values the original permeability to water, e.g., on the order of 3.2 mL/min at 43 psi could be recorded. The pore volume of the core was calculated by the relationship:

$$\frac{\text{Brine-Saturated Core Wt (g)} - \text{Dry Core Wt (g)}}{\text{Brine Density (g/mL)}} = \text{Core Pore Volume (mL)}$$

The brine-saturated core was oilflooded in the conventional manner until oil break-through became detectable by the presence of alternate globules of oil and water in the effluent line. The oilflood was carried out to completion by the 24 hour recycling of oil through the core to remove all of the displaceable water. The total water displaced, i.e., water displaced at the point of oil break-through and water displaced by the 24 hour recycle procedure was recorded as water displaced by oilflood. If desired, oil permeability was determined in a manner analogous to that used above for establishing original permeability to water. Prior to waterflood, the effluent line was air blown to remove oil.

The oilflooded core was waterflooded in the conventional manner until water break-through became detectable by the presence of alternate globules of oil and water in the effluent line. The waterflood was carried to completion by the 24 hour recycling of water through the core to remove all of the displaceable oil. The total oil displaced, i.e., oil displaced at the point of water break-through and oil displaced by the 24 hour recycle procedure was recorded as oil displaced by waterflood. If desired, water permeability after waterflood can be determined in a manner analogous to that used above for original permeability to water. The residual oil volume remaining in the core was calculated by subtracting the oil volume displaced by the waterflood from the water volume displaced by the oilflood. At this point, the core simulated an oil reservoir which had been exhaustively waterflooded. Cores were routinely conditioned in this manner prior to carrying out surfactantflood tests.

EXAMPLE I

This example demonstrates the oil recovery effectiveness of an aqueous saline surfactant system containing petroleum sulfonate, isobutyl alcohol (IBA) and N,N-dimethylformamide (DMF). Waterflood residual oil from a waterwet Berea sandstone core was recovered by surfactantflooding in the conventional manner, i.e., sequential injection of the inventive surfactant system and a thickened aqueous mobility buffer slug of polyacrylamide graded back logarithmically with Arakansas-Burbank water.

The surfactant slug had the following composition:

| 8.71 g | Witco 10-410 (62 wt % active petroleum sulfonate) |
| 3.75 g | Isobutyl alcohol (IBA) |
| 0.75 g | N,N—Dimethylformamide (DMF) |
| 2.70 g | Sodium chloride |
| 134.09 g | Arkansas-Burbank water (A-B water) |

Thus, each component was present in the following weight percentages:

| Petroleum Sulfonate (Active Basis) | 3.6 wt % |
| Isobutyl Alcohol (IBA) | 2.5 wt % |
| N,N—Dimethylformamide (DMF) | 0.5 wt % |
| Sodium chloride | 1.8 wt % |
| Arkansas-Burbank Water | 89.4 wt % |
| Unsulfonated Oil (Witco 10-410) | 2.2 wt % |

The pore volume of the 3"×3' cylindrical Berea sandstone core was 839 mL. A 62.9 mL slug (7.5% PV) of the above surfactant system was injected followed by 419.5 mL (0.5 PV) of Betz Hi Vis polyacrylamide (ca. 1800 ppm) in Arkansas-Burbank water graded back logarithmically with Arkansas-Burbank water.

In preparing the core, 597 mL of water (i.e., 1.8 wt% NaCl in Arkansas-Burbank water) was displaced from the water-saturated core by oilflood indicating the introduction of approximately 597 mL of oil into the core. Subsequent waterflood resulted in about 277 mL of oil being displaced from the core leaving about 320 mL of waterflood residual oil in the Berea sandstone core prior to the surfactantflood.

In the course of the surfactantflood, a total effluent of 2.15 pore volume (ca. 1800 mL) was collected which contained 307 mL of tertiary oil representing 95.9% of the waterflood residual oil.

EXAMPLE II

This example demonstrates the oil recovery efficiency of the inventive surfactant system and this run was carried out in essentially the same manner as the core run described in Example I. This run differed in regard to salinity and surfactant slug composition: salinity was increased from 1.8 wt% NaCl to 2.2 wt% NaCl and equal concentrations of isobutyl alcohol and N,N-dimethylformamide were used in the surfactant system.

The surfactant slug had the following composition:

| 8.71 g | Witco 10-410 (62 wt % active petroleum sulfonate) |
| 2.25 g | Isobutyl alcohol (IBA) |
| 2.25 g | N,N—Dimethylformamide (DMF) |
| 3.3 g | Sodium chloride |
| 133.49 g | Arkansas-Burbank water |

Thus, each component was present in the following concentrations:

| Petroleum Sulfonate (Active Basis) | 3.6 wt % |
| IBA | 1.5 wt % |
| DMF | 1.5 wt % |
| NaCl | 2.2 wt % |
| Arkansas-Burbank Water | 89.0 wt % |
| Unsulfonated Oil (Witco 10-410) | 2.2 wt % |

The pore volume of the 3"×3' cylindrical Berea sandstone core was 847 mL. A 63.5 mL slug (7.5% PV) of the above surfactant system was injected followed by 423.5 mL (0.5 PV) of Betz Hi Vis polyacrylamide (ca. 1800 ppm) in Arkansas-Burbank water graded bank logarithmically with Arkansas-Burbank water.

In preparing the core, 600.7 mL of water (i.e., 2.2 wt% NaCl in Arkansas-Burbank water) was displaced from the water-saturated core by oilflood indicating the introduction of approximately 600.7 mL of oil int the core. Subsequent waterflood resulted in about 283.7 mL of oil being displaced from the core leaving about 317 mL of waterflood residual oil in the Berea sandstone core prior to the surfactantflood.

In the course of the surfactantflood, a total effluent of 2.16 pore volumes (ca. 1830 mL) was collected which contained 296.6 mL of tertiary oil representing 93.6% of the waterflood residual oil.

EXAMPLE III

This example illustrates the recovery efficiency of an inventive surfactant slug containing a 2:1 weight ratio of IBA to DMF at a salinity of 2 weight percent NaCl. The procedure was essentially identical to that used in Examples I and II.

This surfactant slug had the following composition:

| 8.71 g | Witco 10-410 (62 wt % active petroleum sulfonate) |
| 3.00 g | IBA |
| 1.50 g | DMF |
| 3.0 g | NaCl |
| 133.79 g | Arkansas-Burbank Water |

Thus, each component was present in the following concentrations:

| Petroleum Sulfonate (Active Basis) | 3.6 wt % |
| IBA | 2.0 wt % |
| DMF | 1.0 wt % |
| NaCl | 2.0 wt % |
| Arkansas-Burbank Water | 89.2 wt % |
| Unsulfonated Oil (Witco 10-410) | 2.2 wt % |

The pore volume of the 3"×3' cylindrical Berea sandstone core was 840 mL. A 63 mL slug (7.5% PV) of the above surfactant system was injected followed by 420 mL (0.5 PV) of Betz Hi Vis polyacrylamide (ca. 1800 ppm) in Arkansas-Burbank water graded back logarithmically with Arkansas-Burbank water.

In preparing the core, 595 mL of water (i.e., 2 wt % NaCl in Arkansas-Burbank water) was displaced from the water-saturated core by oilflood indicating the introduction of approximately 595 mL of oil into the core. Subsequent waterflood resulted in about 274.5 mL of oil being displaced from the core leaving about 320.5 mL of waterflood residual oil in the Berea sandstone core prior to the surfactantflood.

In the course of the surfactantflood, a total effluent of 2.19 pore volumes (ca. 1840 mL) was collected which contained 292 mL of tertiary oil representing 91% of the waterflood residual oil.

EXAMPLE IV

This run is a duplicate run of that described in Example I. The tertiary oil recovery in Example I was about 96% compared to a recovery of about 90% in this run. This comparison suggests the degree of precision which is possible in carrying out core runs.

The surfactant slug had the following composition:

| 8.71 g | Witco 10-410 (62 wt % active petroleum sulfonate) |
| 3.75 g | IBA |
| 0.75 g | DMF |
| 2.70 g | NaCl |
| 134.09 g | Arkansas-Burbank Water |

Thus, each component was present in the following concentrations:

| Petroleum Sulfonates (Active Basis) | 3.6 wt % |
| IBA | 2.5 wt % |
| DMF | 0.5 wt % |
| NaCl | 1.8 wt % |
| Arkansas-Burbank Water | 89.4 wt % |
| Unsulfonated Oil (Witco 10-410) | 2.2 wt % |

The pore volume of the 3"×3' cylindrical Berea sandstone core was 829 mL. A 62.2 mL slug (7.5% PV) of the above surfactant system was injected followed by 414.5 mL (0.5 PV) of Betz Hi Vis polyacrylamide (ca. 1800 ppm) in Arkansas-Burbank water graded back logarithmically with Arkansas-Burbank water.

In preparing the core, 620 mL of water (i.e., 1.8 wt% NaCl in Arkansas-Burbank water) was displaced from the water-saturated core by oilflood indicating the introduction of approximately 620 mL of oil into the core. Subsequent waterflood resulted in about 316 mL of oil being displaced from the core leaving about 304 mL of waterflood residual oil in the Berea sandstone core prior to the surfactantflood.

In the course of the surfactantflood, a total effluent of 2.15 pore volumes (ca. 1803 mL) was collected which contained 272.8 mL of tertiary oil representing 89.7% of the waterflood residual oil.

EXAMPLE V

This run was carried out in essentially the same manner as the runs described in Examples I-IV. This run was similar to the runs of Examples I and IV except for reversing the relative amounts of IBA and DMF in the surfactant slug and increasing the salinity from 1.8 wt% NaCl to 2.2 wt % NaCl.

The surfactant slug had the following composition:

| 8.71 g | Witco 10-410 (62 wt % active petroleum sulfonate) |
| 0.75 g | IBA |
| 3.75 g | DMF |
| 3.3 g | NaCl |
| 133.49 g | Arkansas-Burbank water |

Thus, each component was present in the following concentrations:

| Petroleum Sulfonate (Active Basis) | 3.6 wt % |
| IBA | 0.5 wt % |
| DMF | 2.5 wt % |
| NaCl | 2.2 wt % |
| Arkansas-Burbank Water | 8.90 wt % |
| Unsulfonated Oil (Witco 10-410) | 2.2 wt % |

The pore volume of the 3"×3' cylindrical Berea sandstone core was 815 mL. A 61.1 mL slug (7.5% PV) of the above surfactant system was injected followed by 407.5 mL (0.5 PV) of Betz Hi Vis polyacrylamide (ca. 1800 ppm) in Arkansas-Burbank water graded back logarithmically with Arkansas-Burbank water.

In preparing the core, 586 mL of water (i.e., 2.2 wt% NaCl in Arkansas-Burbank water) was displaced from the water-saturated core by oilflood indicating the introduction of approximately 586 mL of oil into the core. Subsequent waterflood resulted in about 274 mL of oil being displaced from the core leaving about 312 mL of waterflood residual oil in the Berea sandstone core prior to the surfactantflood.

In the course of the surfactantflood, a total effluent of 1.93 pore volumes (ca. 1570 mL) was collected which contained 242.7 mL of tertiary oil representing 77.7% of the waterflood residual oil.

EXAMPLE VI

This example demonstrates the oil recovery effectiveness of the inventive surfactant system using a 10% PV slug of the surfactant system at 2.2 wt% NaCl and following the surfactant slug with only 0.2 PV of mobility buffer rather than the 0.5 PV mobility buffer slug used in Example I. A 7.5% PV slug of surfactant was used in Example I.

The surfactant slug had the following composition:

| 8.71 g | Witco 10-410 (62 wt % active petroleum sulfonate) |
|---|---|
| 2.25 g | IBA |
| 2.25 g | DMF |
| 3.30 g | NaCl |
| 133.49 g | Arkansas-Burbank water |

Thus, each component was present in the following concentrations:

| Petroleum Sulfonate (Active Basis) | 3.6 wt % |
|---|---|
| IBA | 1.5 wt % |
| DMF | 1.5 wt % |
| NaCl | 2.2 wt % |
| Arkansas-Burbank water | 89.0 wt % |
| Unsulfonated Oil (Witco 10-410) | 2.2 wt % |

The pore volume of the 3"×3' cylindrical Berea sandstone core was 824 mL. An 82.4 mL slug (10% PV) of the above surfactant system was injected followed by 164.8 mL (0.2 PV) of Betz Hi Vis polyacrylamide (ca. 1800 ppm) in Arkansas-Burbank water graded back logarithmically with Arkansas-Burbank water.

In preparing the core, 585.7 mL of water (i.e., 2.2 wt% NaCl in Arkansas-Burbank water) was displaced from the water-saturated core by oilflood indicating the introduction of approximately 585.7 mL of oil into the core. Subsequent waterflood resulted in about 279 mL of oil being displaced from the core leaving about 306.7 mL of waterflood residual oil in the Berea sandstone core prior to the surfactantflood.

In the course of the surfactantflood, a total effluent of 2.08 pore volumes (ca. 1715 mL) was collected which contained 262.1 mL of tertiary oil representing 85.4% of the waterflood residual oil.

EXAMPLE VII

This example demonstrates the oil recovery efficiency of the inventive surfactant system using a 10% PV slug of surfactant at 2.2 wt % NaCl and following the surfactant slug with only 0.1 PV of mobility buffer rather than 0.2 PV of mobility buffer as used in Example VI.

The surfactant slug had the following composition:

| 8.71 g | Witco 10-410 (62 wt % active petroleum sulfonate) |
|---|---|
| 2.25 g | IBA |
| 2.25 g | DMF |
| 3.30 g | NaCl |
| 133.49 g | Arkansas-Burbank water |

Thus, each component was present in the following concentrations:

| Petroleum Sulftonates (Active Basis) | 3.6 wt % |
|---|---|
| IBA | 1.5 wt % |
| DMF | 1.5 wt % |
| NaCl | 2.2 wt % |
| Arkansas-Burbank water | 89.0 wt % |
| Unsulfonated Oil (Witco 10-410) | 2.2 wt % |

The pore volume of the 3"×3' cylindrical Berea sandstone core was 823 mL. An 82.3 mL slug (10% PV) of the above surfactant system was injected followed by 82.3 mL (0.1 PV) of Betz Hi Vis polyacrylamide (ca. 1800 ppm) in Arkansas-Burbank water graded back logarithmically with Arkansas-Burbank water.

In preparing the core, 583 mL of water (i.e., 2.2 wt% NaCl in Arkansas-Burbank water) was displaced from the water-saturated core by oilflood indicating the introduction of approximately 583 mL of oil into the core. Subsequent waterflood resulted in about 270 mL of oil being displaced from the core leaving about 313 mL of waterflood residual oil in the Berea sandstone core prior to the surfactantflood.

In the course of the surfactantflood, a total effluent of 2.19 pore volumes (ca. 1800 mL) was collected which contained 224.9 mL of tertiary oil representing 71.8% of the waterflood residual oil.

EXAMPLE VIII

The surfactant system used in this run contained 1.8 wt% isobutyl alcohol and 1.2 wt% N,N-dimethylformamide. This run was essentially the same as that described in Example II except the latter run contained 1.5 wt% IBA and 1.5 wt% DMF in the surfactant slug.

The surfactant slug had the following composition:

| 8.71 g | Witco 10-410 (62% active petroleum sulfonate) |
|---|---|
| 2.10 g | IBA |
| 1.80 g | DMF |
| 3.3 g | NaCl |
| 133.49 g | Arkansas-Burbank water |

Thus, each component was present in the following concentrations:

| Petroleum Sulfonate (Active Basis) | 3.6 wt % |
|---|---|
| IBA | 1.8 wt % |
| DMF | 1.2 wt % |
| NaCl | 2.2 wt % |
| Arkansas-Burbank water | 89.0 wt % |
| Unsulfonated Oil (Witco 10-410) | 2.2 wt % |

The pore volume of the 3"×3' cylindrical Berea sandstone core was 844 mL. A 63.3 mL slug (7.5% PV) of the above surfactant system was injected followed by 422 mL (0.5 PV) of Betz Hi Vis polyacrylamide (ca. 1800 ppm) in Arkansas-Burbank water graded back logarithmically to Arkansas-Burbank water.

In preparing the core, 584 mL of water (i.e., 2.2 wt % NaCl in Arkansas-Burbank water) was displaced from the water-saturated core by oilflood indicating the introduction of approximately 584 mL of oil into the core. Subsequent waterflood resulted in about 305.9 mL of oil being displaced from the core leaving about 278.1 mL of waterflood residual oil in the Berea sandstone core prior to the surfactantflood.

If the course of the surfactantflood, a total effluent of 1.70 pore volumes (ca. 1432 mL) was collected which contained 232 mL of tertiary oil representing 83.4% of the waterflood residual oil.

EXAMPLE IX

This run was carried out essentially in the same manner as the run described in Example VIII except a 15% PV slug of surfactant was used and no polyacrylamide was used in the drive fluid; the drive fluid was 0.5 PV (417.5 mL) of 2.2 wt% NaCl in Arkansas-Burbank water.

The surfactant slug had the following composition:

| | |
|---|---|
| 11.61 g | Witco 10-410 (62% active petroleum sulfonate) |
| 3.60 g | IBA |
| 2.40 g | DMF |
| 4.40 g | NaCl |
| 177.99 g | Arkansas-Burbank water |

Thus, each component was present in the following concentrations:

| | |
|---|---|
| Petroleum Sulfonate (Active Basis) | 3.6 wt % |
| IBA | 1.8 wt % |
| DMF | 1.2 wt % |
| NaCl | 2.2 wt % |
| Arkansas-Burbank water | 89.0 wt % |
| Unsulfonated Oil (Witco 10-410) | 2.2 wt % |

The pore volume of the 3"×3' cylindrical Berea sandstone core was 835 mL. A 125.3 mL slug (15% PV) of the above surfactant system was injected followed by 417.5 mL (0.5 PV) of 2.2 wt % NaCl in Arkansas-Burbank water.

In preparing the core, 590 mL of water (i.e., 2.2 wt % NaCl in Arkansas-Burbank water) was displaced from the water-saturated core by oilflood indicating the introduction of approximately 590 mL of oil into the core. Subsequent waterflood resulted in about 277 mL of oil being displaced from the core leaving about 313 mL of waterflood residual oil in the Berea sandstone core prior to the surfactant flood.

In the course of the surfactant flood, a total effluent of 4.10 pore volumes (ca. 3426 mL) was collected which contained 234.7 mL of tertiary oil representing 74.9% of the waterflood residual oil.

EXAMPLE X

This example demonstrates the oil recovery effectiveness of an aqueous saline surfactant system containing petroleum sulfonate and N,N-dimethylformamide (DMF). No isobutyl alcohol was used in this run. The procedure was essentially identical to that used in Example I.

The surfactant slug had the following composition:

| | |
|---|---|
| 8.71 g | Witco 10-410 (62 wt % active petroleum sulfonate) |
| 4.50 g | DMF |
| 3.30 g | NaCl |
| 133.49 g | A-B water |

Thus, each component was present in the following concentrations:

| | |
|---|---|
| Petroleum Sulfonate (Active Basis) | 3.6 wt % |
| DMF | 3.0 wt % |
| NaCl | 2.2 wt % |
| A-B Water | 89.0 wt % |
| Unsulfonated Oil (Witco 10-410) | 2.2 wt % |

The pore volume of the 3"×3' cylindrical Berea sandstone core was 806.7 mL. A 62 mL slug (ca. 7.7% PV) of the above surfactant system was injected followed by 403.3 (0.5 PV) of Betz Hi Vis polyacrylamide (1800 ppm) in Arkansas-Burbank water graded back logarithmically with Arkansas-Burbank water.

In preparing the core, 549 mL of water (i.e., 2.2 wt % NaCl in Arkansas-Burbank Water) was displaced from the water-saturated core by oilflood indicating the introduction of approximately 549 mL of oil into the core. Subsequent waterflood resulted in about 230.8 mL of oil being displaced from the core leaving about 318.2 mL of waterflood residual oil in the Berea sandstone core prior to surfactantflooding.

In the course of the surfactantflood, a total effluent of 1.37 pore volumes (ca. 1108 mL) was collected which contained 235.8 mL of tertiary oil representing 74.1% of the waterflood residual oil.

EXAMPLE XI

This example discloses a viscosity enhancement of the inventive surfactant system which was evident at a salinity of 2.6 weight percent NaCl (see FIG. 1) or 2.2 weight percent NaCl (see FIG. 2) using various mixtures of isobutyl alcohol and N,N-dimethylformamide as the cosurfactant components. Referring to FIG. 1, it is apparent that the aqueous saline surfactant system at 2.6 weight percent NaCl exhibited a maximum viscosity over the weight ratio range of 2:1 DMF:IBA to 1:1 DMF:IBA at a surfactant concentration (active basis) of 3.6 weight percent and a total cosurfactant concentration of 3.0 weight percent. Referring to FIG. 2, it is apparent that the aqueous saline surfactant system at 2.2 weight percent exhibited a maximum viscosity over the weight ratio range of 0.5:1 DMF:IBA to 1:1 DMF:IBA at a surfactant concentration (active basis) of 3.6 weight percent and a total cosurfactant concentration of 3.0 weight percent.

The viscosity enhancement at 2.2 weight percent NaCl is further reflected by the data of Table I.

TABLE I

Surfactant System Viscosities at Various DMF:IBA Ratios (2.2 Wt. % NaCl)

| Example No. | % TOR[b] | Wt. % DMF | % PV MB[c] | Wt. % IBA | % PV Surf.[d] | Viscosity (cp) | Wt. Ratio DMF/IBA |
|---|---|---|---|---|---|---|---|
| V | 77.7 | 2.5 | 0.5[a] | 0.5 | 7.5 | 4.1 | 5:1 |
| II | 93.6 | 1.5 | 0.5[a] | 1.5 | 7.5 | 21.2 | 1:1 |
| VI | 85.4 | 1.5 | 0.2[a] | 1.5 | 10 | 17.0 | 1:1 |
| VII | 71.8 | 1.5 | 0.1[a] | 1.5 | 10 | 17.2 | 1:1 |
| VIII | 83.4 | 1.2 | 0.5[a] | 1.8 | 7.5 | 18.5 | 0.66:1 |
| IX | 74.9 | 1.2 | 0.5* | 1.8 | 15 | 20.6 | 0.66:1 |
| X | 74.1 | 3.0 | 0.5[a] | 0 | 7.7 | 1.9 | ∞ |

[a]Polyacrylamide mobility buffer (prepared in Arkansas-Burbank Water).
*No thickened mobility buffer; 2.2 wt. % NaCl was used as aqueous drive fluid.
[b]TOR represents Tertiary Oil Recovery.
[c]MB represents Mobility Buffer.
[d]Surf. represents Surfactant.

Referring to the results of Examples V and X in Table I, it is evident that the tertiary oil recovery is comparable (77.7 vs. 74.1) if the weight ratio of DMF:IBA is on the order of 5:1 or if no IBA is present. The viscosity of the surfactant slugs (4.1 cp and 1.9 cp) were relatively low in these runs. The viscosities of the surfactant slugs in the remaining runs in Table I, i.e., Example II, and Examples VI through IX were relatively higher as noted hereinabove in referring to FIG. 2. The results in Examples II, VI and VII suggest that 25% increases in the percentage pore volume of the surfactant slug did not compensate for 60 and 80 percent pore volume decreases, respectively, in the aqueous polyacrylamide mobility buffer as the percent tertiary oil recovery decreased successively from 93.6 to 85.4 to 71.8. Similarly, the results in Examples VIII and IX suggest that a 100% increase in the percentage pore volume of the surfactant slug did not compensate for the use of an unthickened mobility buffer, i.e., 2.2 weight percent NaCl was used as an aqueous drive as the percent tertiary oil recovery was 83.4 in Example VIII and only 74.9 in Example IX. However, it is noteworthy that the percent tertiary oil recovery in Example IX even without the use of a conventional thickened mobility buffer was significant, i.e., on the order of about 75. This is probably attributable to the use of the thickened surfactant slug which exhibited a viscosity of about 20.6 centipoise.

Reasonable variations and modifications which will become apparent to those skilled in the art can be made in this invention without departing from the spirit and scope thereof.

I claim:

1. An aqueous surfactant composition consisting essentially of:
   (a) sodium chloride;
   (b) a hydrocarbon sulfonate surfactant selected from the group consisting of petroleum sulfonates, olefin sulfonates and alkyl sulfonates having an equivalent weight of from about 225 to about 600; and
   (c) at least one N,N-disubstituted amide cosurfactant represented by the formula:

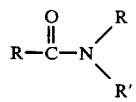

wherein R is either H, or a $C_1$ to $C_5$ alkyl radical and R' is either methyl, ethyl, or propyl with the proviso that the amide has a maximum of 10 carbon atoms wherein said NaCl is present in an amount from 0.01–10 parts by weight, said surfactant is present in an amount from 0.15–15 parts by weight and said amide cosurfactant is present in an amount from 0.05–15 parts by weight.

2. An aqueous composition according to claim 1 wherein said sodium chloride is present in an amount from 0.1–8 parts by weight, said surfactant is present in an amount from 1–12 parts by weight, and said amide cosurfactant is present in an amount from 1–7 parts by weight.

3. A composition according to claim 2 wherein said surfactant is a petroleum sulfonate having an equivalent weight from 325 to 600.

4. A composition according to claim 3 wherein said petroleum sulfonate has an equivalent weight from 325 to 500.

5. A composition according to claim 4 having at least one protective agent selected from the group consisting of polyethoxylated fatty alcohols, polyethoxylated alkylphenols, a sodium salt of a sulfated polyethoxylated alkylphenol, and a sodium salt of a polyethoxylated alkylphenol.

6. A composition according to claim 5 wherein said cosurfactant is N,N-dimethylformamide.

7. A high viscosity aqueous surfactant composition consisting essentially of:
   (a) sodium chloride;
   (b) a hydrocarbon sulfonate surfactant selected from the group consisting of petroleum sulfonates, olefin sulfonates and alkyl sulfonates having an equivalent weight of from about 225 to about 600; and
   (c) a cosurfactant containing at least one $C_1$ to $C_8$ alcohol and at least one N,N-disubstituted amide represented by the formula:

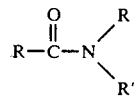

wherein R is either H, or a $C_1$ to $C_5$ alkyl radical and R' is either methyl, ethyl, or propyl with the proviso that the amide has a maximum of 10 carbon atoms wherein said NaCl is present in an amount from 0.01–10 parts by weight, said surfactant is present in an amount from 0.15–15 parts by weight and said amide cosurfactant is present in an amount from 0.05–15 parts by weight and said alcohol is present in an amount from 0.05–15 parts by weight.

8. An aqueous composition according to claim 7 wherein said sodium chloride is present in an amount from 0.1–8 parts by weight, said surfactant is present in an amount from 1–12 parts by weight, and said amide cosurfactant is present in an amount from 1–7 parts by weight and said alcohol is present in an amount from 0.05–15 parts by weight.

9. A composition according to claim 8 wherein said surfactant is a petroleum sulfonate having an equivalent weight from 325 to 600.

10. A composition according to claim 9 wherein said petroleum sulfonate has an equivalent weight from 325 to 500.

11. A composition according to claim 10 having at least one protective agent selected from the group consisting of polyethoxylated fatty alcohols, polyethoxylated alkylphenols, a sodium salt of a sulfated polyethoxylated alkylphenol, and a sodium salt of a polyethoxylated alkylphenol.

12. A composition according to claim 11 wherein said cosurfactant contains isobutyl alcohol and N,N-dimethylformamide.

13. A process for recovery of hydrocarbon from a subterranean formation comprising injecting an aqueous surfactant system consisting essentially of NaCl, a hydrocarbon sulfonate surfactant selected from the group consisting of petroleum sulfonates, olefin sulfonates and alkyl sulfonates having an equivalent weight from 225 to 600 and at least one amide cosurfactant represented by the formula:

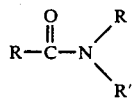

wherein R is either H, or a $C_1$ to $C_5$ alkyl radical and R' is either methyl, ethyl, or propyl with the proviso that the amide has a maximum of 10 carbon atoms wherein said NaCl is present in an amount from 0.01–10 parts by weight, surfactant is present in an amount of from about 0.15 to about 15 parts by weight and said amide cosurfactant is present in an amount from about 0.05–15 parts by weight thereby displacing the hydrocarbon from said subterranean formation and thereafter recovering the displaced hydrocarbon.

14. A process according to claim 13 wherein a $C_1$ to $C_8$ alcohol is additionally present as a cosurfactant in an amount from about 0.05–15 parts by weight.

15. A process in accordance with claim 14 wherein a mobility buffer is injected into said subterranean formation following the surfactant system.

16. A process in accordance with claim 15 wherein an aqueous drive fluid is injected into said subterranean formation following said mobility buffer fluid.

17. A process in accordance with claim 16 wherein said surfactant system further comprises at least one protective agent selected from the group consisting of polyethoxylated fatty alcohols, polyethoxylated alkylphenols, a sodium salt of a sulfated polyethoxylated alkylphenol, and a sodium salt of a polyethoxylated alkylphenol and is injected into a subterranean formation containing hard brine.

18. A process in accordance with claim 17 wherein said cosurfactant contains isobutyl alcohol and N,N-dimethylformamide.

* * * * *